United States Patent
Boileau et al.

(10) Patent No.: US 12,546,274 B2
(45) Date of Patent: Feb. 10, 2026

(54) MOVABLE-CASCADE THRUST REVERSER COMPRISING A MULTI-FUNCTIONAL FIXED STRUCTURE

(71) Applicant: SAFRAN NACELLES, Gonfreville-l'Orcher (FR)

(72) Inventors: Patrick André Boileau, Moissy-Cramayel (FR); Gina Ferrier, Moissy-Cramayel (FR); Fabien Jourdan, Moissy-Cramayel (FR); Xavier Cazuc, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/555,188

(22) PCT Filed: Apr. 8, 2022

(86) PCT No.: PCT/FR2022/050660
§ 371 (c)(1),
(2) Date: Oct. 12, 2023

(87) PCT Pub. No.: WO2022/219270
PCT Pub. Date: Oct. 20, 2022

(65) Prior Publication Data
US 2025/0067231 A1    Feb. 27, 2025

(30) Foreign Application Priority Data

Apr. 13, 2021  (FR) ........................................ 2103775

(51) Int. Cl.
*F02K 1/72*  (2006.01)

(52) U.S. Cl.
CPC ............ *F02K 1/72* (2013.01); *F05D 2230/72* (2013.01)

(58) Field of Classification Search
CPC .. F02K 1/70; F02K 1/72; B64D 29/06; B64D 29/08
See application file for complete search history.

(56) References Cited

U.S. PATENT DOCUMENTS

| | | | |
|---|---|---|---|
| 2014/0234090 A1* | 8/2014 | Hurlin | F02K 1/72 415/182.1 |
| 2015/0028518 A1 | 1/2015 | Esseghir et al. | |
| 2015/0260126 A1 | 9/2015 | Caruel | |
| 2016/0025039 A1 | 1/2016 | Boileau | |
| 2017/0298869 A1* | 10/2017 | Crawford | F02K 1/72 |
| 2017/0321634 A1* | 11/2017 | Boileau | B64D 29/06 |

(Continued)

FOREIGN PATENT DOCUMENTS

| | | |
|---|---|---|
| FR | 2978497 A1 | 2/2013 |
| FR | 2980173 A1 | 3/2013 |

(Continued)

OTHER PUBLICATIONS

International Search Report for PCT/FR2022/050660 dated Jul. 11, 2022.

(Continued)

*Primary Examiner* — Andrew H Nguyen
(74) *Attorney, Agent, or Firm* — McDonald Hopkins LLC

(57) ABSTRACT

A movable-cascade thrust reverser includes a multi-functional annular fixed structure configured to be rigidly connected to a turbine engine fan casing or to an intermediate casing secured to the fan casing.

8 Claims, 8 Drawing Sheets

(56) References Cited

U.S. PATENT DOCUMENTS

| | | | |
|---|---|---|---|
| 2020/0277916 A1 | 9/2020 | Caruel | |
| 2020/0309065 A1* | 10/2020 | Boileau | ................. B64D 29/08 |
| 2021/0003096 A1 | 1/2021 | Thierry | |
| 2022/0333549 A1 | 10/2022 | Caruel | |

FOREIGN PATENT DOCUMENTS

| | | | | |
|---|---|---|---|---|
| FR | 2981989 A1 | 5/2013 | | |
| FR | 2999239 A1 | 6/2014 | | |
| FR | 3002785 A1 | 9/2014 | | |
| FR | 3073572 A1 | 5/2019 | | |
| FR | 3074225 A1 | 5/2019 | | |
| FR | 3100577 A1 | 3/2021 | | |
| WO | WO-2019115960 A1 * | 6/2019 | ............. B64D 27/16 |

OTHER PUBLICATIONS

Search Report for French application No. FR2103775 dated Dec. 6, 2021.

* cited by examiner

MOVABLE-CASCADE THRUST REVERSER COMPRISING A MULTI-FUNCTIONAL FIXED STRUCTURE

CROSS-REFERENCE TO RELATED APPLICATIONS

This is the National Stage of PCT international application PCT/FR2022/050660, filed on Apr. 8, 2022, which claims the priority of French Patent Application No. 2103775, filed Apr. 13, 2021, both of which are incorporated herein by reference in their entireties.

TECHNICAL FIELD

The invention relates to the field of aircraft propulsion unit thrust reversers and, more particularly, to movable-cascade reversers.

PRIOR ART

The cascade reversers currently used in the aeronautics sector comprise a front frame forming with the cascades a fixed part of the reverser intended to be connected to a turbine engine casing.

Over the last decade, technical developments have made it possible to develop movable-cascade reversers, as described for example in the documents FR2981989A1, FR2999239A1, FR3002785A1 and FR3073572A1.

Compared to a conventional fixed-cascade reverser, the movability of the cascades makes it possible to reduce the length of the nacelle and hence the mass thereof and the drag generated thereby.

The movable-cascade reversers known in the prior art do not comprise a front frame and several functions of these reversers, such as cascade guidance, deflection of the reversal flow to the front of the cascades or radial cylinder sleeve guidance, are performed by members fastened to the turbine engine.

This results in a relatively complex and voluminous architecture.

DISCLOSURE OF THE INVENTION

An aim of the invention is that of providing a movable-cascade reverser having a simplified and/or more compact architecture.

Another aim of the invention is that of reducing the mass and cost of a movable-cascade reverser.

To this end, the invention relates to a thrust reverser for an aircraft propulsion unit, according to the features of claim 1.

Such a fixed structure makes it possible to connect the reverser to a propulsion unit turbine engine simply while reducing the overall size of the reverser.

Such a fixed structure furthermore makes it possible to pool several functions of the reverser and simplify the general architecture of the reverser, particularly by functionalising the fixed structure more, now integrating a deflection edge.

The invention thus makes it possible to reduce the mass and cost of the reverser.

It should be noted that such a movability of the cowl is particularly found in a reverser having a so-called "D" architecture, known as "D-Duct".

The fixed structure preferably comprises an upper beam configured to cooperate with the cowl so as to be able to transmit loads from the cowl to the casing of the turbine engine and/or from the cowl to a mast of the propulsion unit.

In one embodiment, the fixed structure comprises elements for guiding the cascades between the forward position and the retracted position.

When the fixed structure comprises the upper beam cited above, the latter can bear at least one of said guiding elements.

According to one alternative embodiment, the lower beam can bear at least one of the guiding elements cited above.

In one embodiment, the fixed structure includes members forming radial and/or tangential and/or axial stops for the cascades.

The fixed structure of the invention can obviously form or bear other members or elements than those described above, in order to carry out additional or complementary functions of the reverser or the propulsion unit.

The invention also relates to a propulsion unit for an aircraft, comprising a turbine engine and a reverser as defined hereinabove.

In one embodiment, said casing is formed by a fan casing of the turbine engine or by an intermediate casing extending axially to the rear of the fan casing.

Other advantages and features of the invention will appear upon reading the detailed, non-limiting description that follows.

BRIEF DESCRIPTION OF THE DRAWINGS

The following detailed description refers to the accompanying drawings in which.

DETAILED DESCRIPTION OF SOME EMBODIMENTS

Figure 1:
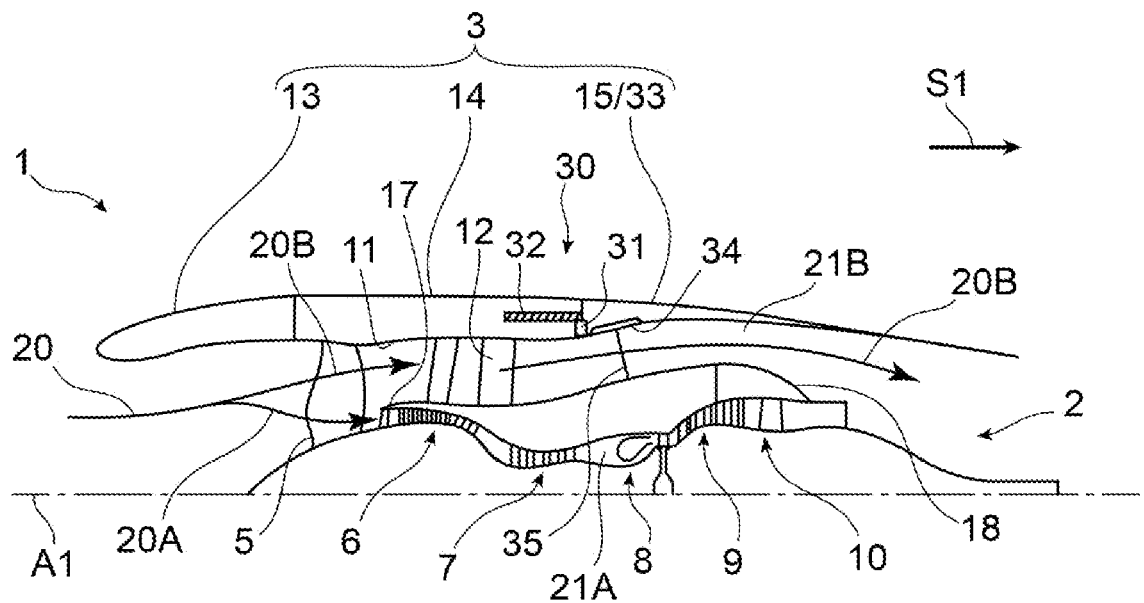
FIG. 1 is a schematic longitudinal sectional half-view of a propulsion unit, comprising a reverser according to the invention in a direct thrust configuration.
Figure 2:
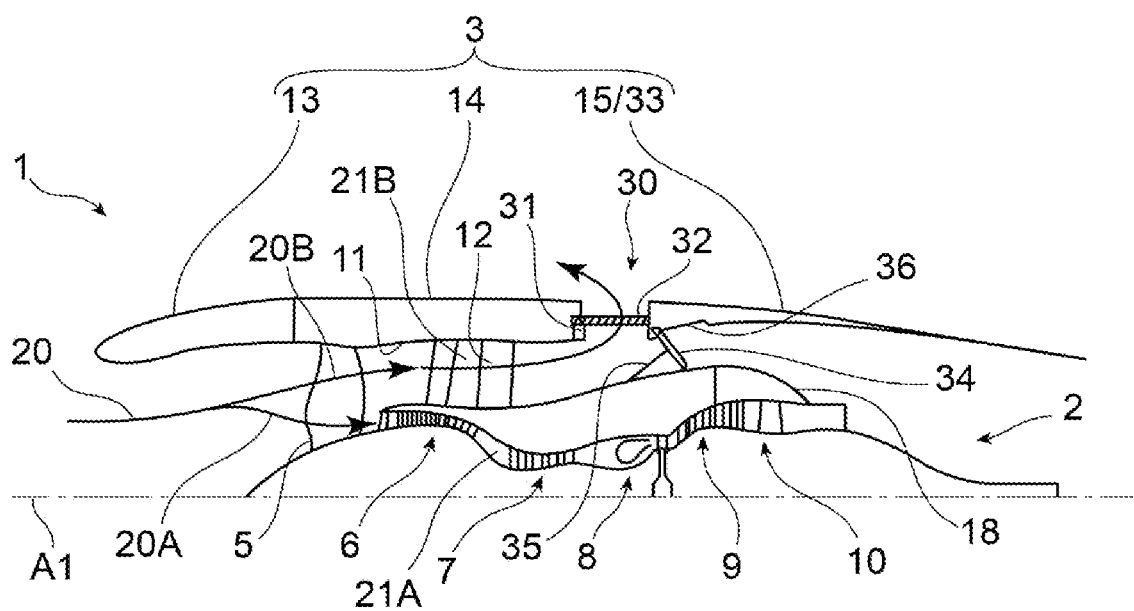
FIG. 2 is a schematic longitudinal sectional half-view of the propulsion unit of FIG. 1, the reverser being in a reverse thrust configuration.

A propulsion unit 1 of an aircraft is represented in FIGS. 1 and 2, having a longitudinal central axis A1.

Hereinafter, the terms "front" and "rear" are defined with respect to a direction S1 of gas flow through the propulsion unit 1 along the longitudinal central axis A1, when said unit generates a thrust.

The propulsion unit 1 comprises a turbine engine 2, a nacelle 3 as well as a mast—not seen in FIGS. 1 and 2 (see mast 4 in FIGS. 3 and 4)—intended to connect the propulsion unit 1 to a wing (not shown) of the aircraft.

The turbine engine 2 is in this example a turbofan engine comprising, from upstream to downstream, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator.

The turbojet engine 2 is equipped with a fan casing 11 connected to the gas generator by structural arms 12.

The nacelle 3 comprises a front section forming an air inlet 13, a median section which includes fan cowls 14 covering the fan casing 11 and a rear section 15.

During operation, an air flow 20 enters the propulsion unit 1 through the air inlet 13, passes through the fan 5 and then splits into a primary flow 20A and a secondary flow 20B. The primary flow 20A flows in a primary gas flow path 21A passing through the gas generator. The secondary flow 20B flows into a secondary flow path 21B surrounding the gas generator.

Figure 4:
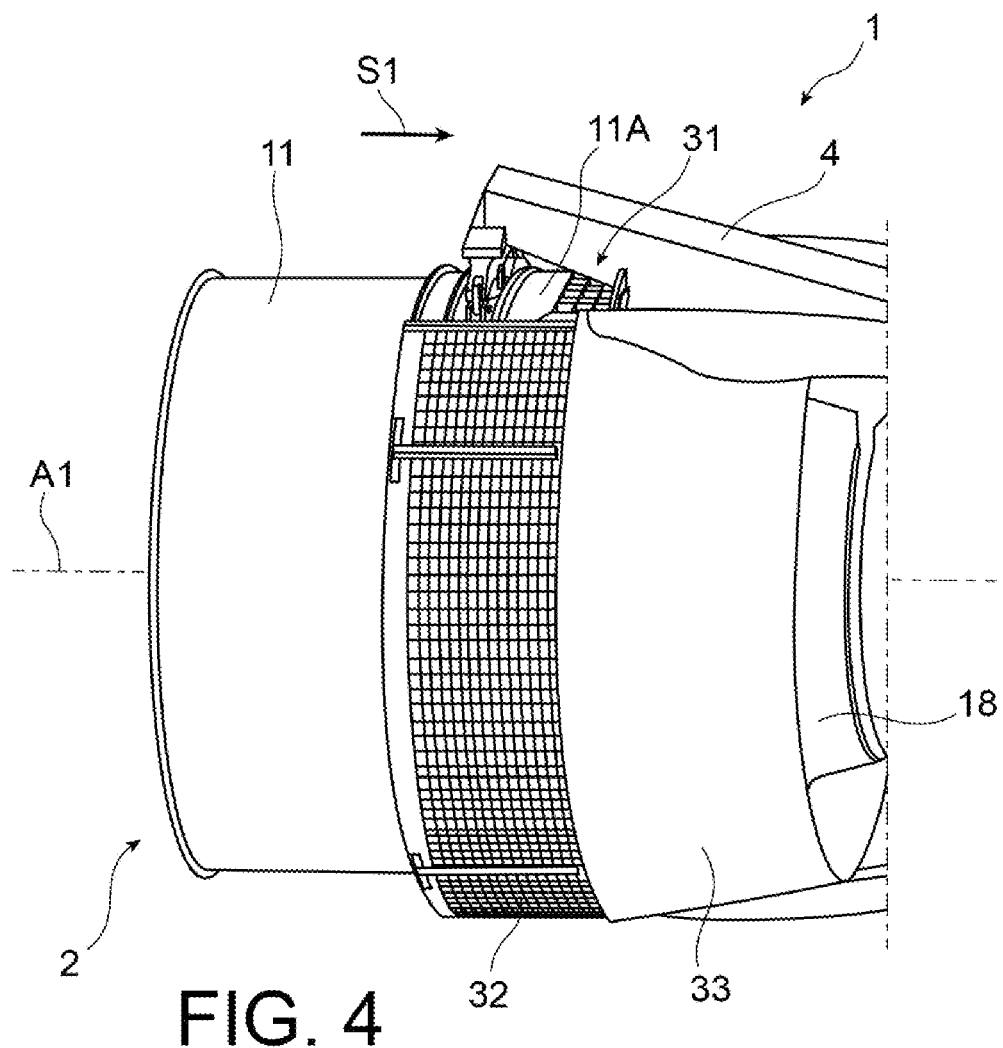
FIG. 4 is a schematic perspective view of a portion of the propulsion unit of FIG. 3, showing cascades and a cowl of the reverser.
Figure 5:
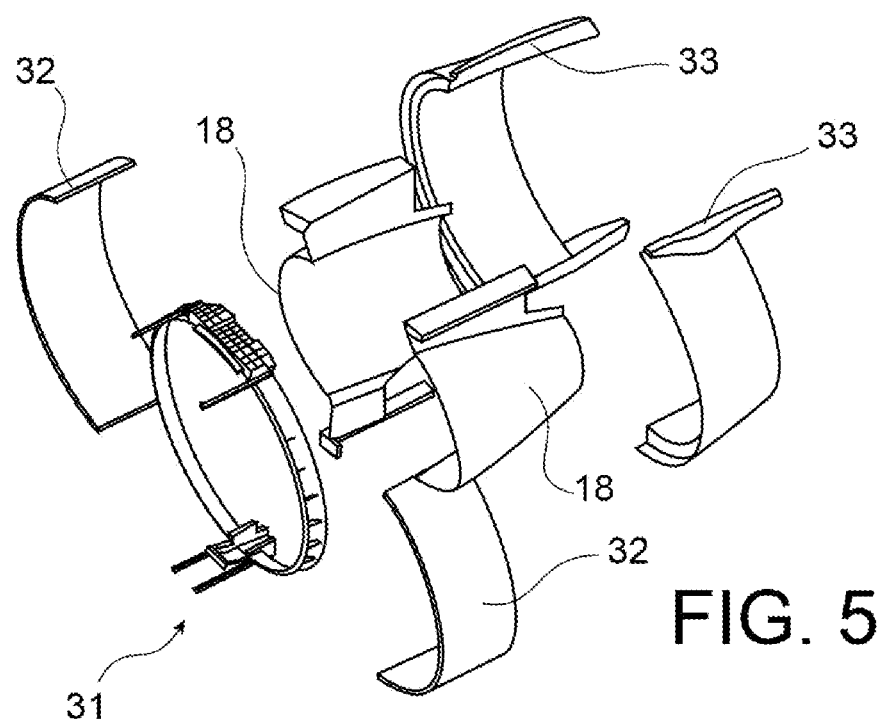
FIG. 5 is a schematic exploded perspective view of the reverser of the propulsion unit of FIG. 3.

The secondary flow path 21B is delimited radially inwards by a fixed internal fairing which covers the gas generator. In this example, the fixed internal fairing comprises a first segment 17 (see FIGS. 1 and 3) belonging to the median section 14 and a second segment 18 (see FIGS. 1, 4 and 5) extending to the rear from the first segment 17 so as to form a portion of the rear section 15.

Radially outwards, the secondary flow path 21B is delimited by the fan casing 11 and, in the configuration of FIG. 1, by movable cowls forming the rear section 15 of the nacelle 3 (see further hereinafter).

The nacelle 3 comprises a thrust inverter 30 comprising, on one hand, a fixed structure 31 secured to the fan casing 11 according to the principles detailed hereinafter and, on the other, a movable structure relative to the fixed structure 31.

The movable structure of the inverter 30 comprises deflection cascades 32, the movable cowls 33 cited above, shutter flaps 34 and tie rods 35.

FIG. 1 shows the reverser 30 in a direct thrust configuration.

In this configuration, the movable cowls 33 are in a closing position, or forward position, wherein they are substantially bearing on the fixed structure 31 and wherein the cascades 32 are housed in a space delimited radially by the fan casing 11, on one hand, and by the fan cowls 14, on the other.

In the direct thrust configuration, the shutter flaps 34 are retracted into a cavity 36 (see FIG. 2) formed by the movable cowls 33.

The reverser 30 thus makes it possible to channel the secondary flow 20B to the rear of the propulsion unit 1 so as to generate a thrust.

In the configuration of FIG. 1, the cascades 32 and the movable cowls 33, which are secured to each other, are in a so-called direct thrust position.

FIG. 2 shows the reverser 30 in a reverse thrust configuration.

In this configuration, the movable cowls 33 are in an opening position, or retracted position, wherein they are longitudinally removed from the fixed structure 31 so as to define a radial opening of the secondary flow path 21B. The cascades 32 extend through this radial opening.

In the reverse thrust configuration, the shutter flaps 34 are deployed radially in the secondary flow path 21B so as to direct the secondary flow 20B towards the cascades 32 which make it possible to orient the flow thus redirected to the front of the propulsion unit 1 in order to generate a counterthrust.

In the configuration of FIG. 2, the cascades 32 and the movable cowls 33 are in a so-called reverse thrust position.

More specifically, the invention relates to the fixed structure 31 of the reverser 30.

Figure 6:
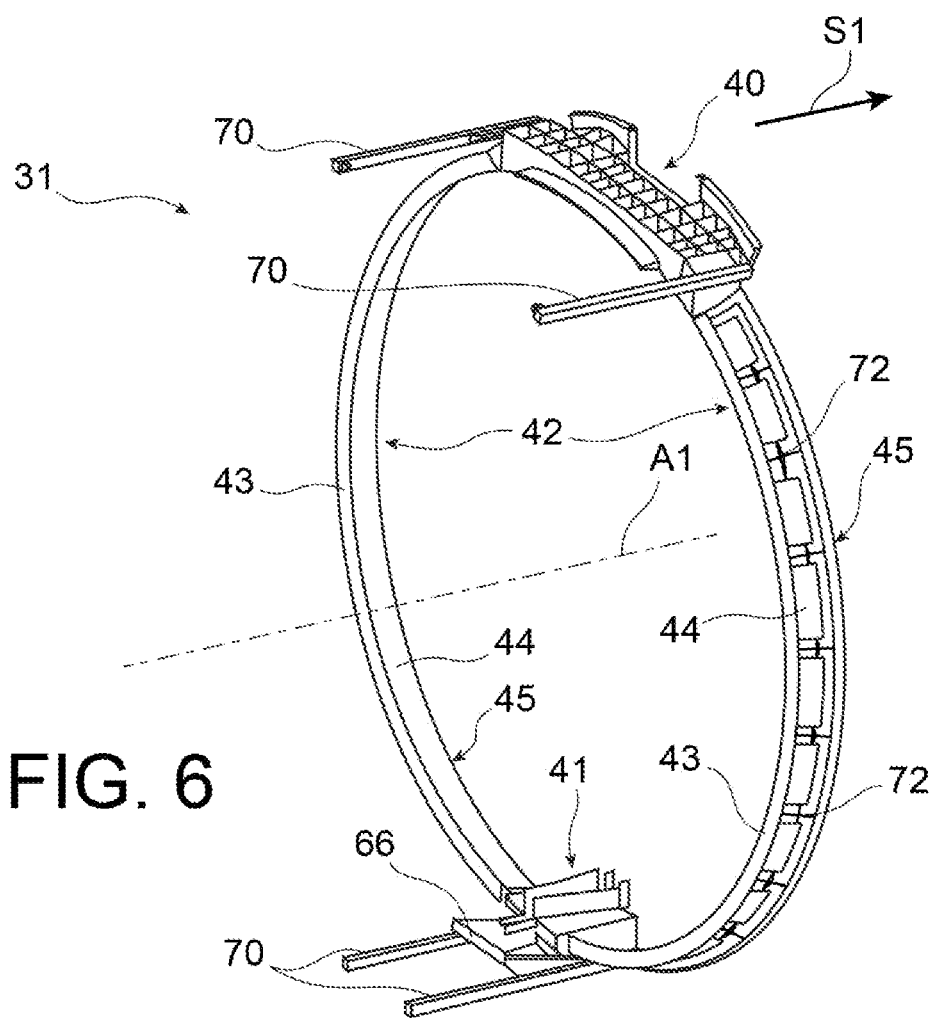
FIG. 6 is a schematic perspective view of the fixed structure of the reverser of the propulsion unit of FIG. 3.

With reference to FIG. 6 which illustrates a non-restrictive embodiment of the invention, the fixed structure 31 has an overall annular shape extending about the axis A1.

In this example, the fixed structure 31 has a closed curved shape and therefore forms a ring.

In embodiments not shown, the fixed structure can have an unclosed curved shape, for example so as to form a portion of a ring or several portions configured to have an overall annular shape together.

The fixed structure 31 of FIG. 6 comprises an upper beam 40 intended to extend at twelve o'clock, i.e. circumferentially at the mast 4 of the propulsion unit 1, a lower beam 41 intended to extend at six o'clock, i.e. opposite the mast 4, and two circumferential sectors 42 each connecting the upper beam 40 and the lower beam 41 to one another.

Each of the circumferential sectors 42 comprises a front end 43 forming a radial flange and a portion 44 extending axially from the front end 43 so as to form a rear end 45 of the corresponding circumferential sector 42.

Figure 7:
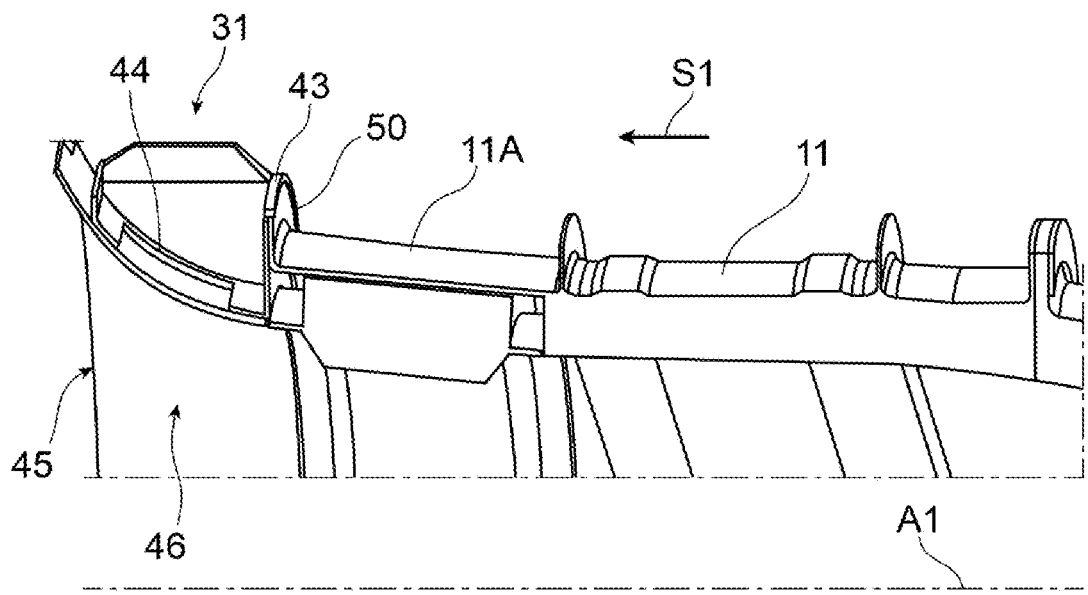
FIG. 7 is a schematic perspective and longitudinal sectional view of a fan casing, an intermediate casing and the fixed structure of the reverser of the propulsion unit of FIG. 3.
Figure 8:
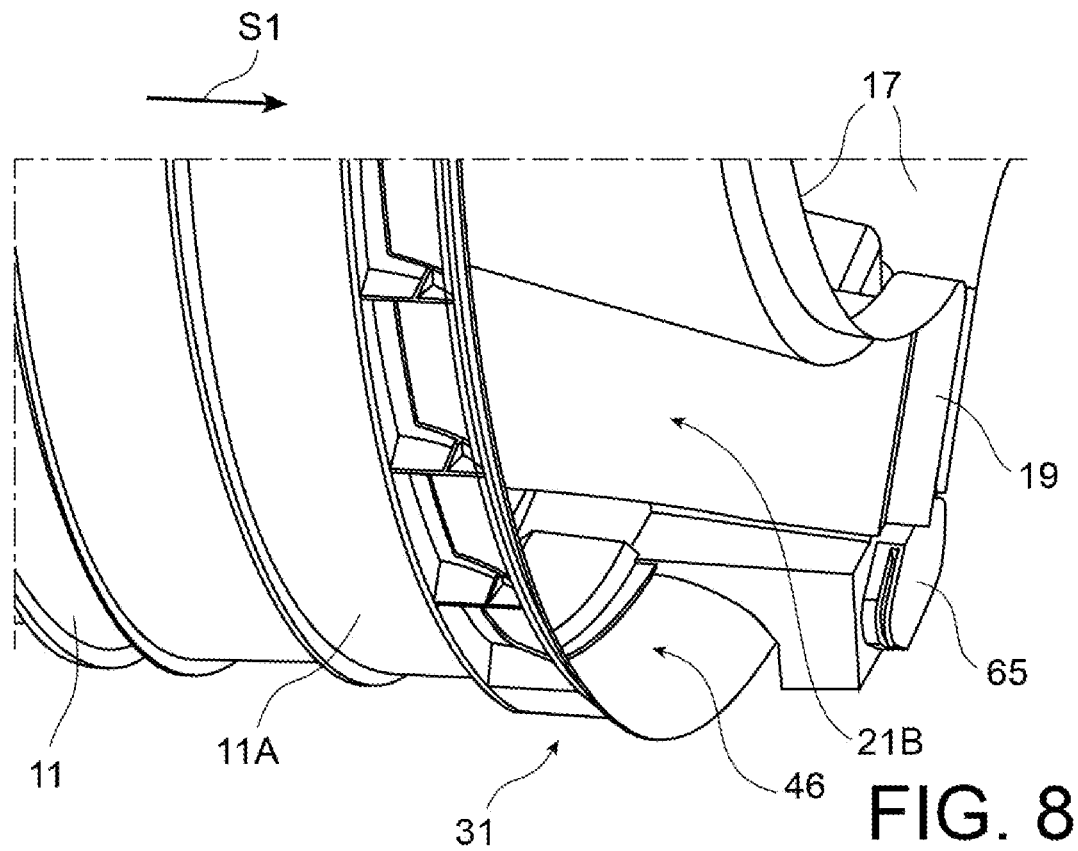
FIG. 8 is a schematic perspective view of a lower portion, at six o'clock, of the propulsion unit of FIG. 3.

With reference to FIGS. 6 to 8, the radial flange 43 formed by the circumferential sectors 42 is configured to bear on a radial flange 50 formed in this example by a rear end of an intermediate casing 11A which extends the fan casing 11 of the turbine engine 2 so as to fasten along a rigid connection the fixed structure 31 of the reverser 30 to this casing 11A.

The turbine engine 2 can alternatively be devoid of an intermediate casing 11A in which case the fixed structure 31 can be connected in a similar way directly to the fan casing 11 (not shown). The following description applies by analogy to such an alternative.

By definition, a rigid connection is a connection guaranteeing the assembled parts a well-defined relative position, constant over time, regardless of the nature and the intensity of the external stress, under normal conditions of use.

The fixed structure 31 of the reverser 30 is hence secured to the fan casing 11 of the turbine engine 2, both in translation and in rotation about the axis A1.

In this example, the radial flanges 43 and 50 are connected to one another by riveting.

The radial flanges 43 and 50 can be connected to one another by other types of connection means, for example by bolting.

Figure 3:
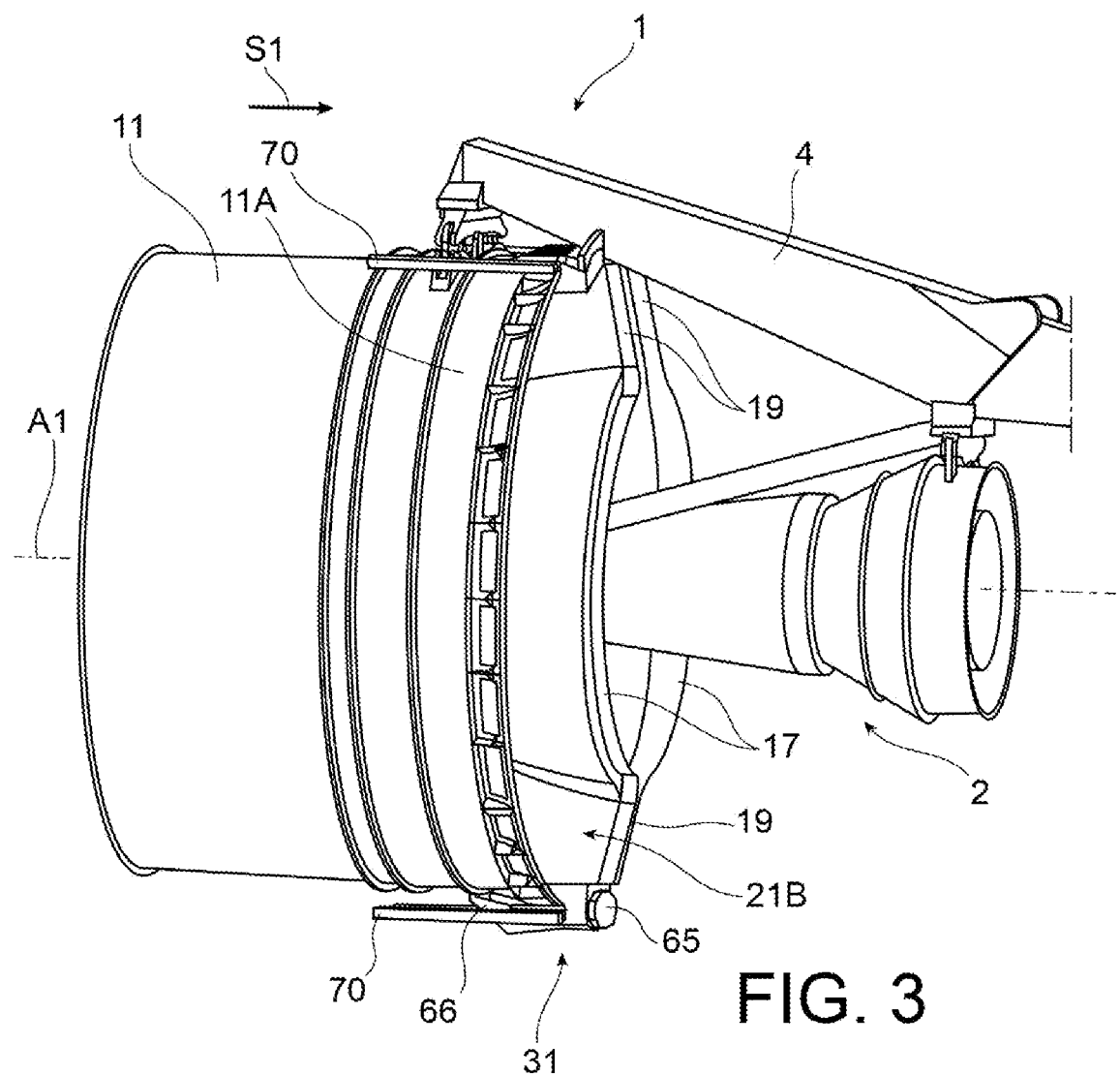
FIG. 3 is a schematic perspective view of a portion of a propulsion unit similar to that of FIG. 1, showing a turbine engine, a mast and a fixed structure of a reverser according to the invention.

With reference to FIGS. 3, 7 and 8, the fixed structure 31 of the reverser 30 thus forms an axial extension of the casing 11A.

In this example, the portion 44 of the circumferential sectors 42 forms an inner surface 46 which thus delimits a segment of the secondary flow path 21B when the reverser 30 is in a reverse thrust configuration.

In this example, the inner surface 46 of the circumferential sectors 42 is radially flared, i.e. it moves progressively away from the axis A1 from the radial flange 43 to the rear end 45, and forms a deflection edge.

The curved shape of the deflection edge 46 makes it possible, by the Coanda effect, to initiate the change of direction of the flow intended to pass through the cascades 32 for thrust reversal.

Figure 9:
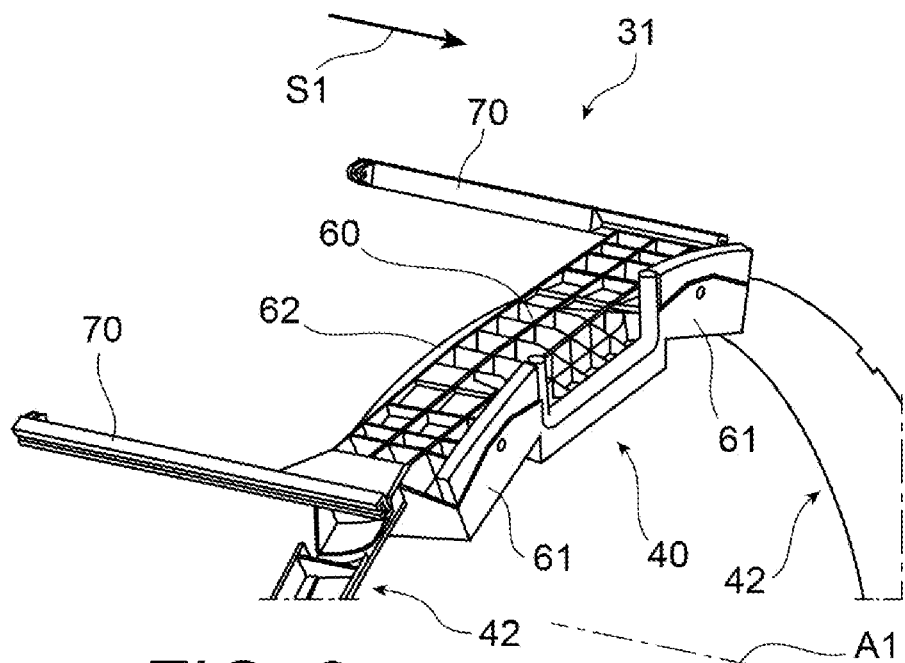
FIG. 9 is a schematic perspective view of an upper beam of the fixed structure of the reverser of the propulsion unit of FIG. 3.
Figure 10:
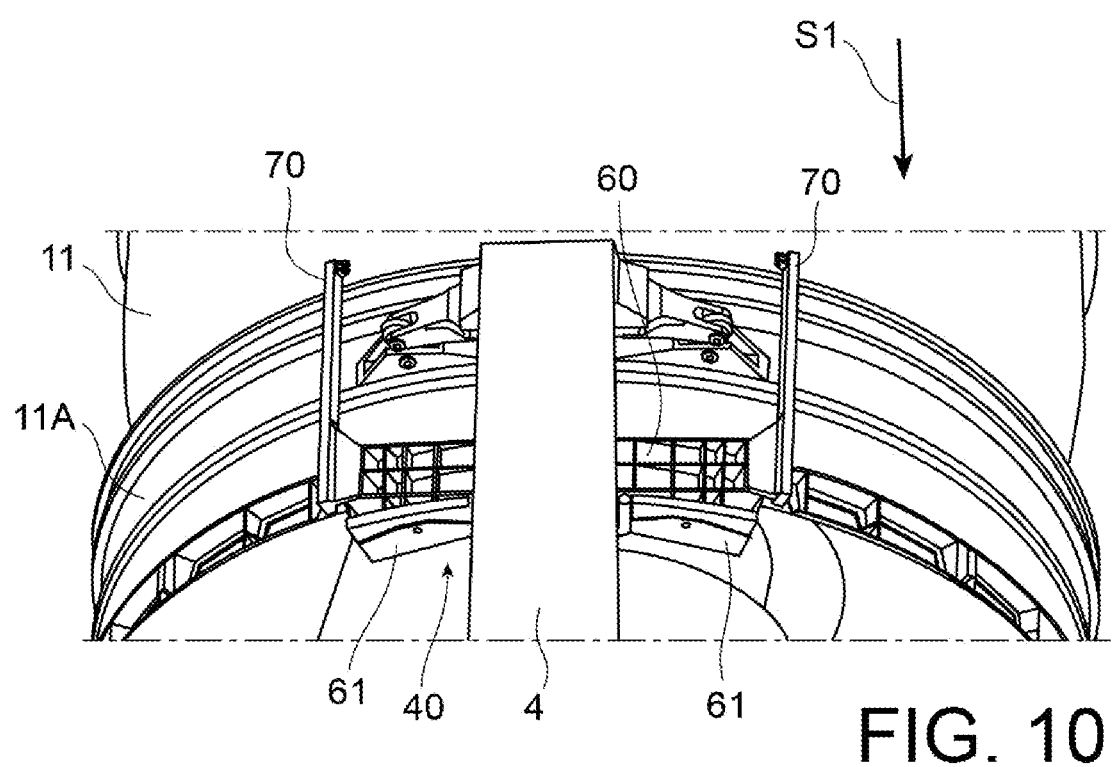
FIG. 10 is a schematic perspective view of an upper portion, at twelve o'clock, of the propulsion unit of FIG. 3.

With reference to FIGS. 9 and 10, the upper beam 40 comprises a mesh module 60 extending circumferentially so as to extend on either side of the mast 4.

The upper beam 40 also comprises two radial flanges 61 forming a rear end thereof.

The radial flanges 61 are intended to connect the fixed structure 31 to beams (not shown) secured to the mast 4 and each extending on either side of the mast 4. These beams and the radial flanges 61 are particularly configured to support the movable cowls 33 of the reverser 30.

The module 60 of the upper beam 40 forms a front end 62 which extends circumferentially the radial flange 43 of the circumferential sectors 42 in order to cooperate with the radial flange 50 of the casing 11A.

The upper beam 40 thus acts as an interface and structural connection with the mast 4, the casing 11A and the movable cowls 33.

The upper beam 40 can also make it possible to perform sealing, utility routing and fire and ventilation zone segregation functions.

In this example, the fixed internal fairing 17 comprises in a manner known per se connection arms 19 at twelve o'clock and at six o'clock (see FIG. 3).

In circumferential continuity with the circumferential sectors 42 of the fixed structure 31, the upper beam 40 delimits, on either side of the connection arms 19 at twelve o'clock, a respective portion of the secondary flow path 21B.

Moreover, the reverser 30 has in this example a D-Duct architecture, well known in the field of the invention, the movable cowls 33 being hinged to said beams secured to the mast 4 so as to be capable of being moved in a butterfly fashion between a closed flying position and an open maintenance position.

The lower beam 41 of the fixed structure 31, seen in FIGS. 3, 6 and 8, has a particular benefit for such a D-Duct architecture.

In particular, the lower beam 41 comprises a member 65 for connecting and positioning the movable cowls 33 in the flying position (FIGS. 3 and 8).

The lower beam 41 also comprises a fastening element 66 (FIGS. 3 and 6) for securing the lower beam 41 to the casing 11A.

The lower beam 41 thus acts as an interface and structural connection with the casing 11A and the movable cowls 33.

Similarly to the upper beam 40, the lower beam 41 delimits, on either side of the connection arms 19 at six o'clock, a respective portion of the secondary flow path 21B (see FIG. 8) and makes it possible to perform sealing and utility routing functions.

The reverser 30 comprises elements for guiding the cascades 32 during the movement thereof between the forward and retracted positions.

Generally, the guiding elements can comprise guide tracks and/or rails and/or rollers connected to the fan casing 11 and/or to the intermediate casing 11A and/or to the fixed structure 31 of the reverser 30.

In this example, the guiding elements comprise rails 70 of which two are secured to the upper beam 40 and two others secured to the lower beam 41 of the fixed structure 31 of the reverser 30 (see FIGS. 3, 6, 9 and 10).

Figure 11:
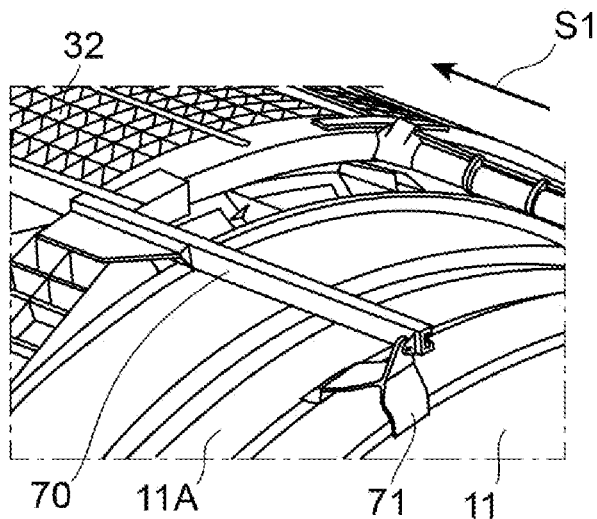
FIG. 11 is a schematic perspective view of a portion of the propulsion unit of FIG. 3, showing a cascade guide rail.

In this example, the rails 70 are fastened to the fixed structure 31 by the rear end thereof and to the casing 11A by the front end thereof, via fittings 71 as illustrated in FIG. 11.

Alternatively, the front end of the rails 70 can extend in an overhanging position or be connected to the fan casing 11 or to the fixed structure 31 via ferrules and/or connecting rods and/or any other connection means (embodiments not shown).

The rails 70 thus perform a guidance function of the cascades 32 and, in a reverse thrust configuration, an aerodynamic load, essentially radial and tangential, absorption function.

Obviously, according to the dimensions of the cascades 32 and the loads to be absorbed, the reverser 30 can comprise additional and/or otherwise configured rails.

Figure 12:
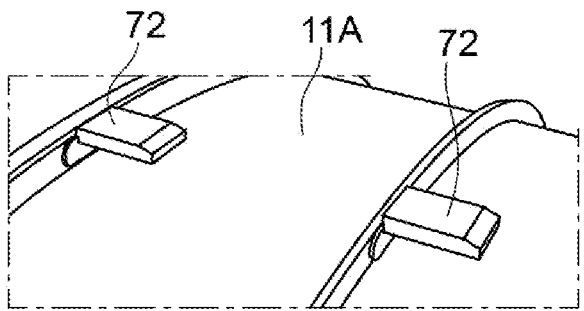
FIG. 12 is a schematic perspective view of a portion of a casing of the propulsion unit of FIG. 3, showing radial cascade positioning stops.

FIG. 12 shows contact blocks 72 fastened to the casing 11A and making it possible to radially position the cascades 32, absorb essentially radial loads to which they are subjected and/or compensate for play, in particular in a direct thrust configuration.

Such contact blocks 72 thus form radial stops which can be regularly distributed about the axis A1.

In the example of FIG. 6, the fixed structure 31 of the reverser 30 includes such contact blocks 72 mounted on the outer surface of the portion 44 of the circumferential sectors 42.

Figure 13:
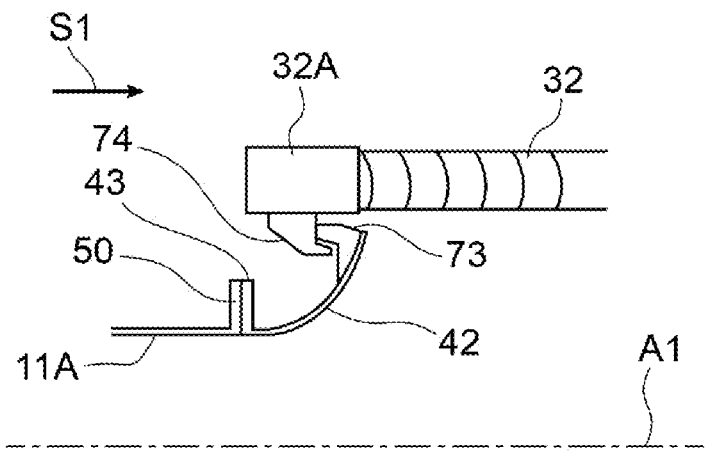
FIG. 13 is a schematic longitudinal sectional half-view of a portion of the propulsion unit of FIG. 3, showing an axial and radial cascade positioning stop in a reverse thrust configuration.

In the embodiment of FIG. 13, the circumferential sectors 42 of the fixed structure 31 of the reverser 30 form an axial flange 73 and the cascades 32 comprise a stop 74, borne in this example by a front frame 32A of the cascades 32.

The stop 74 of the cascades 32 is configured to cooperate with the axial flange 73 of the fixed structure 31 when the cascades 32 are in the retracted position, so as to form an axial end-of-travel and radial stop capable of reducing the deformation of the cascades 32.

In one embodiment not shown, the fixed structure 31 of the reverser 30 and/or the casing 11 and/or 11A can comprise tangential stops for the cascades 32 in the forward position and/or in the retracted position.

Such axial and/or radial and/or circumferential stops make it possible to improve the distribution and absorption of the loads of the cascades 32 and reduce the loading of cylinders (not shown) for moving the cascades 32 and the movable cowls 33, particularly in the reverse thrust configuration wherein the cylinders are typically at the end of travel.

In this example, the fixed structure 31 of the reverser 30 comprises members (not shown) for supporting the cylinders and thus optimise the load path when changing configuration of the reverser 30.

The above description illustrates the multi-functional principle of the fixed structure 31 of the invention which makes it possible to reduce the compactness of the reverser 30 as well the mass and cost of the propulsion unit 1.

Of course, the invention is not limited to the above-described embodiments. For example, the reverser 30 can have a C-Duct or O-Duct architecture and the fixed structure 31 thereof be devoid of a lower beam 41.

What is claimed is:

1. Thrust reverser for an aircraft propulsion unit, having a longitudinal central axis and comprising a fixed structure, at least one cowl and deflection cascades, the at least one cowl and the cascades being movable relative to the fixed structure in translation along the longitudinal central axis between a forward direct thrust position and a retracted reverse thrust position, characterised in that the fixed structure has an annular shape extending about the longitudinal central axis and is configured to be fastened along a rigid connection onto a rear end of a casing of a turbine engine of the propulsion unit so as to form an axial extension of the casing, the fixed structure forming a deflection edge for an air flow intended to pass through the cascades when the at least one cowl and the cascades are in the reverse thrust position, the at least one cowl being rotatable about a pivot axis between a closed flying position and an open maintenance position, the fixed structure comprising a lower beam disposed circumferentially opposite a mast of the propulsion unit configured to cooperate with the at least one cowl when the latter is in the closed position and an upper beam disposed circumferentially at the mast of the propulsion unit and comprising a mesh module extending circumferentially to at least the sides of the mast and forming a front end that circumferentially extends a radial flange of the fixed structure and that is configured to fasten the fixed structure to the casing.

2. Reverser according to claim 1, wherein the upper beam is configured to cooperate with the at least one cowl so as to be able to transmit loads from the at least one cowl to the casing of the turbine engine and/or from the at least one cowl to the mast of the propulsion unit.

3. Reverser according to claim 2, wherein the fixed structure comprises elements for guiding the cascades between the forward position and the retracted position, and wherein the upper beam bears at least one of said guiding elements.

4. Reverser according to claim 1, wherein the fixed structure comprises elements for guiding the cascades between the forward position and the retracted position.

5. Reverser according to claim 4, wherein the lower beam bears at least one of said guiding elements.

6. Reverser according to claim 1, wherein the fixed structure includes members forming radial and/or tangential and/or axial stops for the cascades.

7. Propulsion unit for an aircraft, comprising a turbine engine and a reverser according to claim 1.

8. Propulsion unit according to claim 7, wherein said casing is formed by a fan casing of the turbine engine or by an intermediate casing extending axially to the rear of the fan casing.

* * * * *